(12) United States Patent
Suzuki et al.

(10) Patent No.: US 7,038,870 B2
(45) Date of Patent: May 2, 2006

(54) DATA STORAGE DEVICE, DATA WRITE METHOD, AND PROGRAM

(75) Inventors: Hiroaki Suzuki, Machida (JP); Noriaki Sato, Fujisawa (JP); Michiya Kazusawa, Fujisawa (JP); Hideo Asano, Machida (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 28 days.

(21) Appl. No.: 10/691,757

(22) Filed: Oct. 22, 2003

(65) Prior Publication Data
US 2004/0212910 A1    Oct. 28, 2004

(30) Foreign Application Priority Data
Nov. 21, 2002    (JP)    ............................ 2002-338078

(51) Int. Cl.
*G11B 5/02*    (2006.01)
*G11B 5/09*    (2006.01)
(52) U.S. Cl. .......................................... 360/46; 360/68
(58) Field of Classification Search .................. 360/46, 360/65–68
See application file for complete search history.

(56) References Cited
U.S. PATENT DOCUMENTS
5,831,783 A * 11/1998 Shinohara .................... 360/67
6,188,531 B1 * 2/2001 Chang et al. ................ 360/46
6,788,483 B1 * 9/2004 Ferris et al. ................. 360/46

FOREIGN PATENT DOCUMENTS
JP    05-258215 A    10/1993

* cited by examiner

*Primary Examiner*—David Hudspeth
*Assistant Examiner*—Varsha A. Kapadia
(74) *Attorney, Agent, or Firm*—Townsend and Townsend and Crew LLP

(57) ABSTRACT

A data storage device, data write method, and program to avoid extra power consumption and suppress a write error that may result from voltage variations. To write data onto a magnetic disk, a write circuit generates a write current that is to be supplied to a write head. The write circuit operates on a positive power supply voltage provided by a host computer, and on a negative power supply voltage generated by a programmable DC—DC converter mounted on a hard disk drive's card. The magnitude of the negative power supply voltage generated by the programmable DC—DC converter is varied in accordance with the temperature surrounding the magnetic disk. Further, the magnitude of the negative power supply voltage generated by the programmable DC—DC converter is varied in accordance with the magnitude of the positive power supply voltage supplied from the host computer.

20 Claims, 13 Drawing Sheets

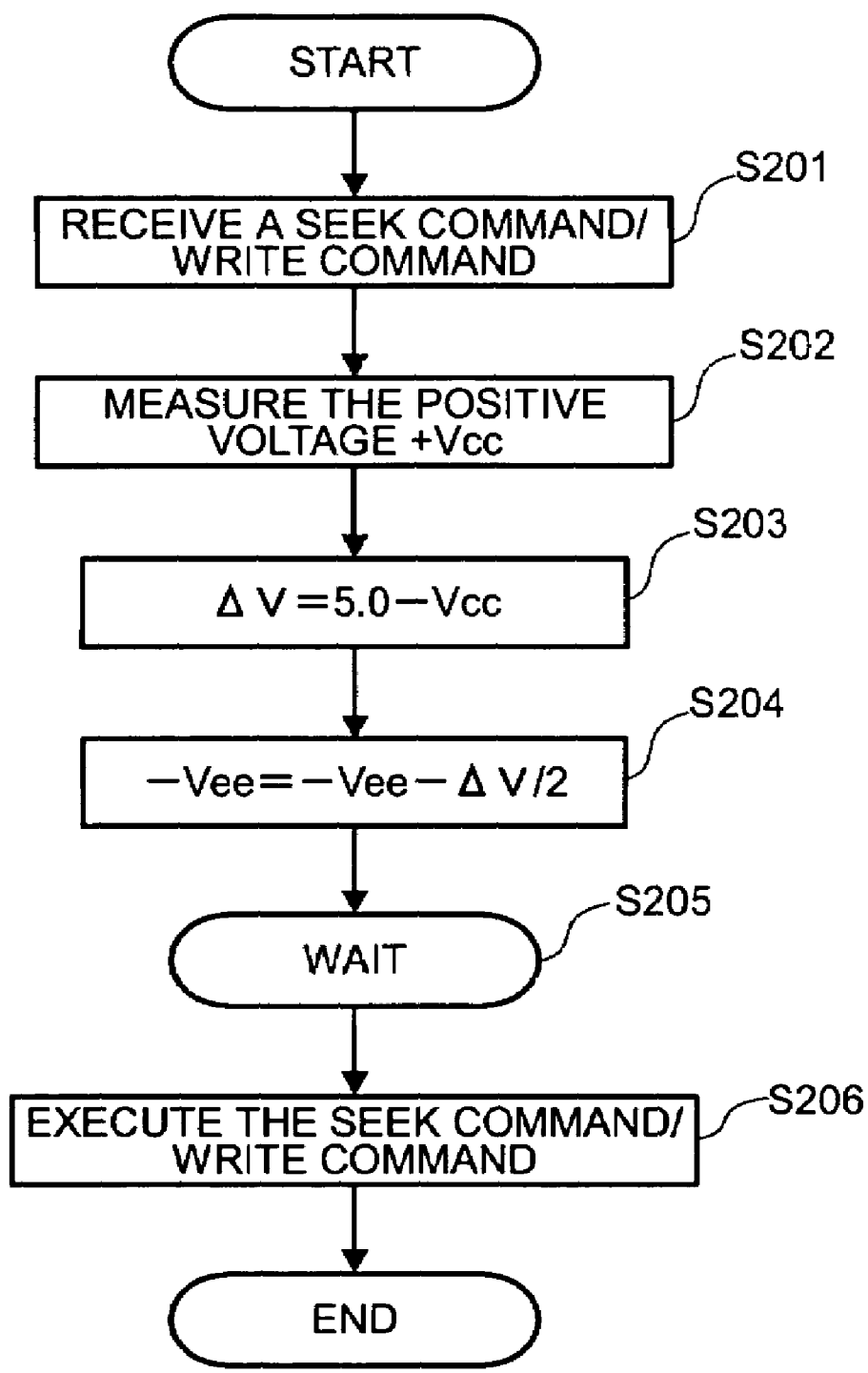

DATA STORAGE DEVICE, DATA WRITE METHOD, AND PROGRAM

CROSS-REFERENCES TO RELATED APPLICATIONS

The present application claims priority to Japanese Patent Application 2002-338078, filed Nov. 21, 2002, which is incorporated by reference herein.

BACKGROUND OF THE INVENTION

The present invention relates to a hard disk drive or other data storage device, and more particularly to the supply of voltage to a write circuit for writing data onto a magnetic disk.

A hard disk drive is one of the most widely used external storage devices for a computer. As is generally known, a magnetic disk, which is used as a storage medium for the hard disk drive, uses sectors as minimum data recording units. The sectors are obtained by radially dividing tracks that are obtained by concentrically dividing the disk surface. The hard disk drive has a composite magnetic head (read/write head), which comprises two devices: a read head and a write head. The read head reads data stored on the magnetic disk, whereas the write head writes data onto the magnetic disk. The magnetic head is mounted on an actuator mechanism, which is oscillated by a VCM (voice coil motor).

When the magnetic head writes data onto the magnetic disk, a specified current flows to the write head to magnetize a magnetic film that is formed on the magnetic disk. When data is written on the magnetic disk, new data frequently overwrites the existing data. The overwrite characteristic, which indicates whether an overwrite is properly performed, depends on the current value for a data write performed by the write head (write current value). It is known that when the write current value is small, the overwrite characteristic deteriorates because the magnetic pattern of previously written data cannot be adequately remagnetized. If, on the other hand, the write current value is excessively great, a squeeze problem arises in remagnetizing the magnetic pattern of an adjacent track. Further, the read signal characteristics may frequently deteriorate depending on the write current value. It is therefore necessary that the write current value be properly set.

However, the optimum write current value cannot be uniquely determined. For example, it is known that the above-mentioned overwrite characteristic varies with the hard disk drive installation environment parameters, especially the temperature. More specifically, the Hc or coercivity of a magnetic film formed on the magnetic disk surface increases with a decrease in the temperature. Therefore, if it is assumed that the write current value is constant, the lower the temperature, the worse the overwrite characteristic.

To improve the overwrite characteristic in a low-temperature environment, Patent Document 1 proposed a technology for providing a greater write current value in a low-temperature environment than in a high-temperature environment.

A differential amplifier circuit has been put to practical use with recent hard disk drives in order to supply a positive voltage and negative voltage to a head amplifier to improve the signal-to-noise ratio of a read signal output from the read head. Accordingly, write operations performed by the write head have also begun to use a positive voltage and negative voltage. The advantage provided by supplying positive and negative voltage to the write circuit in the head amplifier is that the write speed can be increased.

This type of hard disk drive receives positive voltage from a host computer and supplies the positive voltage to the head amplifier's write circuit while a circuit for the hard disk drive converts the positive voltage to a negative voltage and supplies the resulting negative voltage to the head amplifier's write circuit.

Japanese Patent Laid-open No. 5-258215

The write circuit of the above-mentioned hard disk drive is now described. This write circuit reverses the write current direction and provides voltage drive even at the time of constant current drive by directly supplying the negative voltage, which is supplied to the head amplifier's write circuit, to the write head via a variable internal limiting resistor. If an unduly high negative voltage is applied to the head, the amount of electrical current overshoot increases at the time of write current direction reversal, causing an equivalent increase in the write current. Therefore, the internal limiting resistance is adjusted to minimize the amount of overshoot for acquiring the necessary electrical current reversal speed, thereby ensuring that the voltage applied to the head is lower than the supplied negative voltage. In this case, the power consumed by the internal limiting resistor turns to heat and does not contribute to a data write at all. Therefore, a technical problem has arisen so that a voltage-driven write circuit consumes more power although it provides an attractively high speed.

Further, the positive voltage that the hard disk drive receives from the host computer is unstable when compared to the negative voltage generated inside the hard disk drive. Therefore, when the electrical current direction reverses, the above-mentioned type of circuit uses a stable negative voltage via a low-resistance path. However, even if the positive voltage drops, the positive voltage applied to the head terminal on the opposite side lowers. Consequently, the amount of overshoot decreases to a certain extent (although the resistance for current limiting is fixed at a high level). As a result, the write current may equivalently decrease so as to incur a data write error.

BRIEF SUMMARY OF THE INVENTION

The present invention has been made to solve the foregoing technical problems, and is designed to minimize power consumption. The present invention also suppresses a write error that may be caused by variations in the received positive voltage.

The present invention proposes that a circuit for a hard disk drive or other data storage device that generates a variable negative voltage. Generating such a variable negative voltage makes it possible to supply only the necessary amount of power and curb the influence of variations in the received positive voltage.

The data storage device of the present invention comprises a write head for writing data onto a magnetic disk; a write circuit for generating the write current to be supplied to the write head by using a supplied positive voltage and negative voltage; a converter for generating the negative voltage to be supplied to the write circuit from the positive voltage; and a controller for variably setting the magnitude of the negative voltage.

The controller sets the magnitude of the negative voltage in accordance with an ambient temperature for the magnetic disk. If the ambient temperature is low, the controller sets a large absolute value for the negative voltage. If, however, the ambient temperature is high, the controller sets a small absolute value for the negative voltage.

Further, the controller of the data storage device according to the present invention sets the magnitude of the negative voltage in accordance with the magnitude of the positive voltage. If the average value of the positive voltage is small, the controller sets a large absolute value for the negative voltage. If, however, the average value of the positive voltage is great, the controller sets a small absolute value for the negative voltage.

Furthermore, the controller changes the magnitude of the negative voltage (for instance, by decreasing its absolute value) when the write head is not performing a write operation.

The write circuit ensures that the write current value used for a specified period (which can be confirmed, for instance, by counting the number of write gate signal toggles) after the start of a write is greater than the write current value used after the specified period has elapsed. Further, the write circuit is a voltage-driven type that directly provides voltage drive for the write head.

The converter comprises a register for storing a voltage command from the controller and a voltage converter for converting the voltage in accordance with the value stored in the register.

The present invention also provides a program that enables a computer to exercise a first function for receiving a seek command or a write command for a read/write head over the magnetic disk; a second function for setting, in accordance with a specified condition, the magnitude of the negative voltage to be supplied to the write circuit that drives the read/write head; and a third function for causing the read/write head over the magnetic disk to perform a seek operation or a write operation.

The present invention also provides a data write method that functionally implements the individual steps of the aforementioned program according to the present invention.

The data write method, for which the specified condition is an ambient temperature of the magnetic disk, comprises a second step of setting a large absolute value for the negative voltage if the ambient temperature is low and setting a small absolute value for the negative voltage if the ambient temperature is high.

Further, the data write method, for which the specified condition is the magnitude of a supplied positive voltage, comprises a second step of setting a large absolute value for the negative voltage if the average positive voltage is low and setting a small absolute value for the negative voltage if the average positive voltage is high.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 13 is a flowchart that illustrates the negative power supply voltage setup process according to Embodiment 3.

DETAILED DESCRIPTION OF THE INVENTION

Embodiments of the present invention are now described with reference to the accompanying drawings.

Embodiment 1

Figure 1:
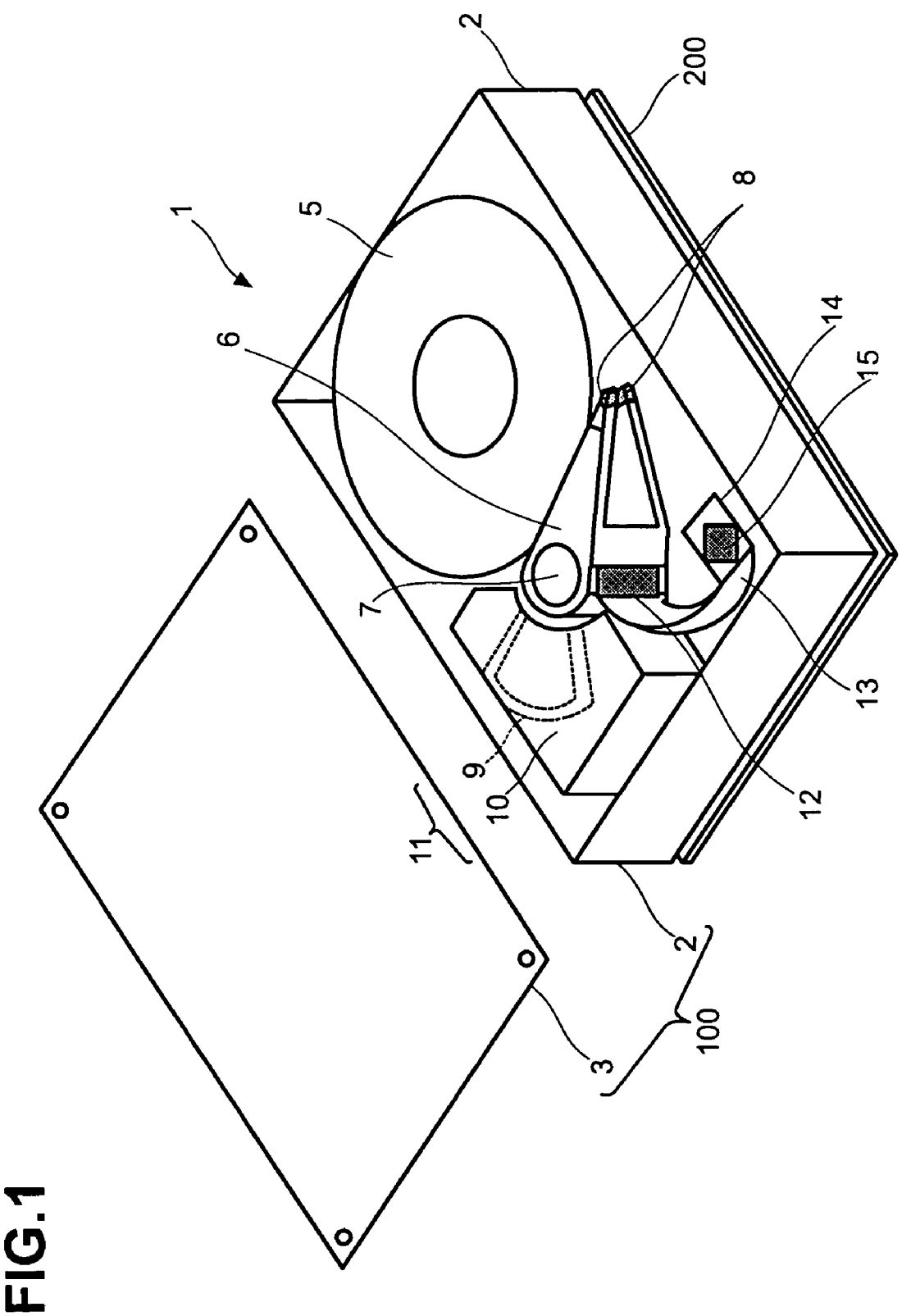
FIG. 1 is a schematic perspective view of a hard disk drive (HDD).
Figure 2:
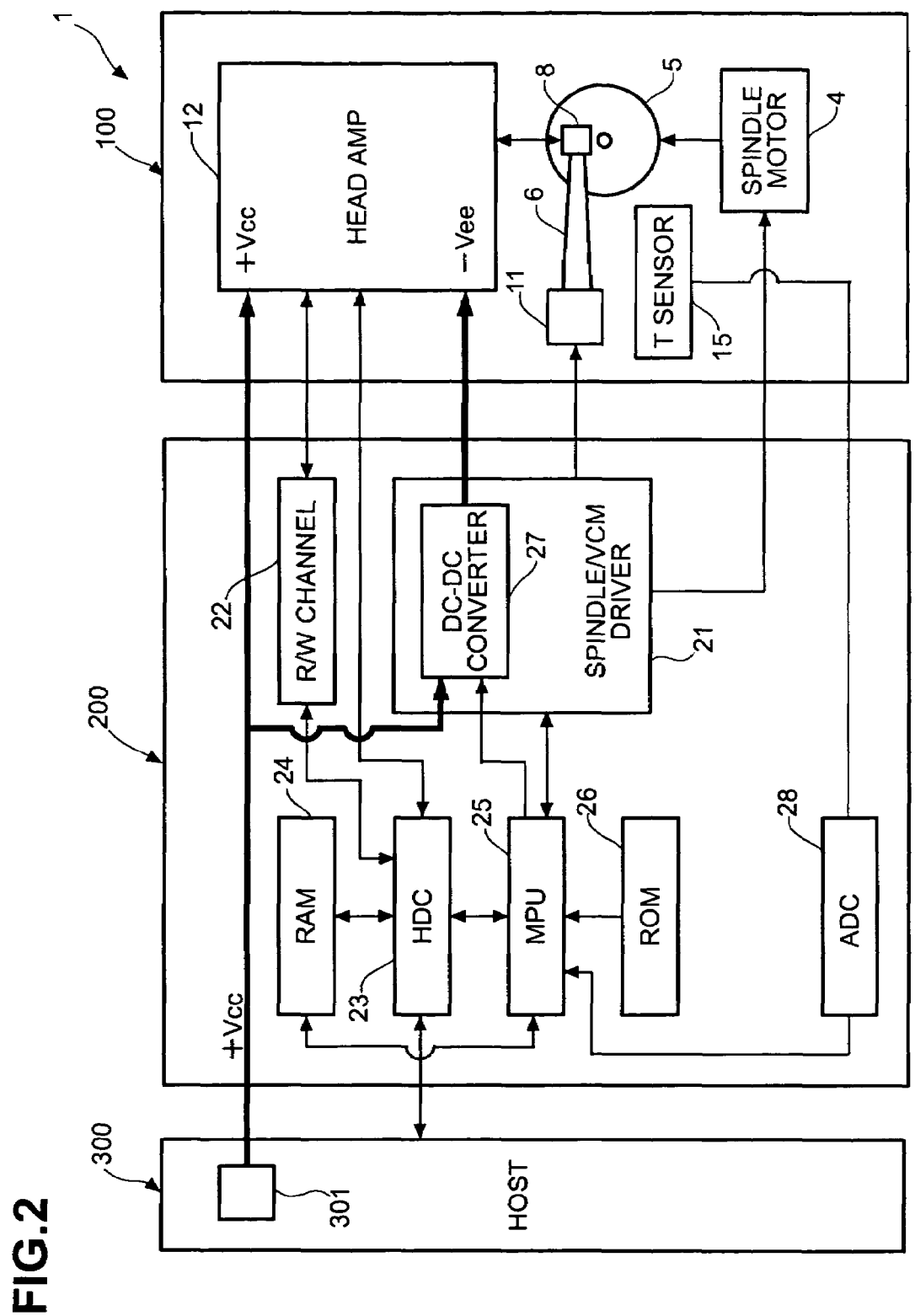
FIG. 2 is a functional block diagram of the HDD according to Embodiment 1.

FIG. 1 is a schematic perspective view of a hard disk drive (HDD) 1 according to embodiment 1. FIG. 2 is a functional block diagram of HDD 1. As shown in FIG. 1, HDD 1, which serves as a data storage device, constitutes a disk enclosure 100, which is formulated by installing a top cover 3 to seal the open top of a box-shaped base 2, which is made, for instance, of an aluminum alloy. Top cover 3 is made, for instance, of stainless steel, and screwed down to base 2 by a sealing member (not shown), which is shaped like a rectangular frame. Disk enclosure 100 contains a spindle motor 4, which comprises, for instance, a hub-in, three-phase DC servomotor. Spindle motor 4 imparts rotary drive to a magnetic disk 5, which is a storage medium. One or more units of magnetic disk 5 are installed in compliance with the storage capacity requirements for HDD 1. A card 200 is attached to the lower surface of base 2. Card 200 carries a signal processing circuit, a drive circuit for spindle motor 4, and other components described later.

An actuator arm 6 is mounted within disk enclosure 100. The middle section of actuator arm 6 is supported above base 2 so that it can pivot on a pivot axis 7. A composite magnetic head 8 is mounted on one end of actuator arm 6. A VCM (voice coil motor) coil 9 is mounted on the remaining end of actuator arm 6. VCM coil 9 and a stator 10, which is made of a permanent magnet and fastened to disk enclosure 100, constitute a VCM 11. When a VCM current flows to VCM coil 9, actuator arm 6 can move to a specified position over magnetic disk 5. This movement causes composite magnetic head 8 to perform a seek operation. Magnetic disk 5 is driven to rotate around a spindle axis of spindle motor 4. When HDD 1 does not operate, magnetic disk 5 comes to a standstill.

Figure 3A:
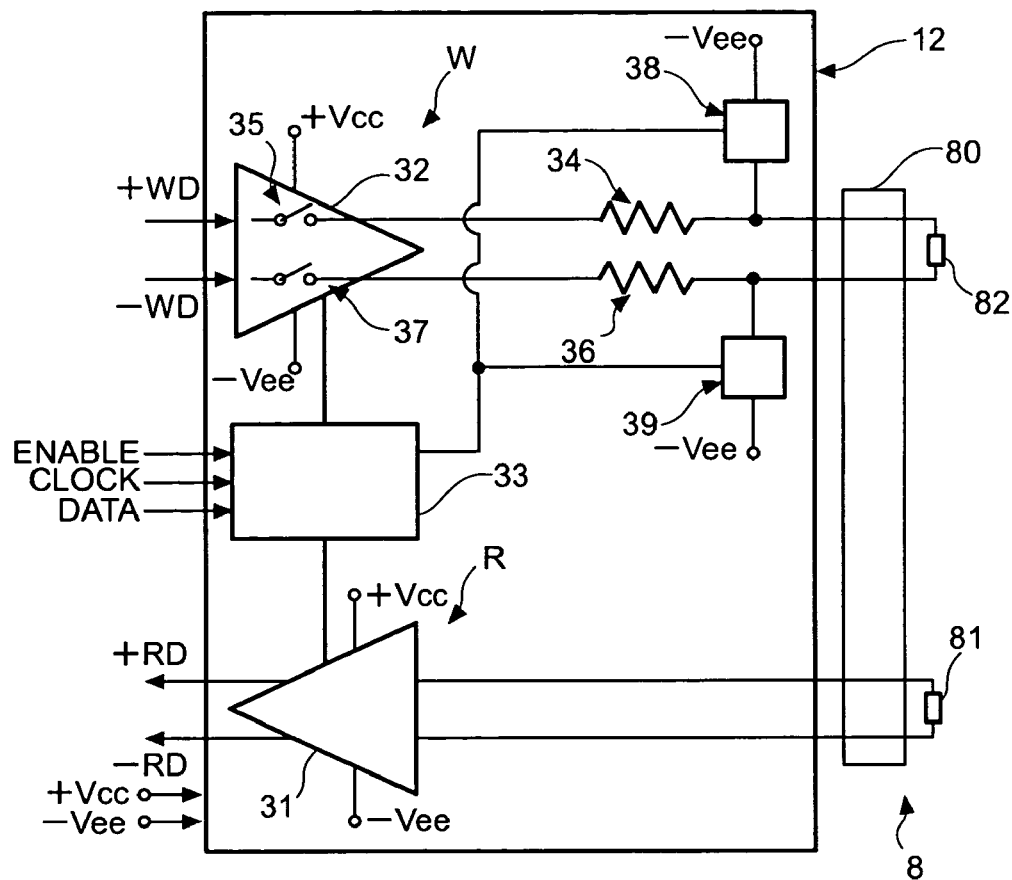
FIG. 3(a) is a schematic functional block diagram illustrating the configuration of a head amplifier.

As shown in FIG. 3(a), composite magnetic head 8 is a combination of an ILS (integrated lead suspension) 80, a read head 81, which comprises a GMR (giant magnetoresistive) sensor, and a write head 82, which comprises an induction-type converter. Read head 81 and write head 82 are mounted on an end of ILS 80. Read head 81 reads servo information when it reads data, writes data, or performs a seek. For a data read operation, read head 81 also reads data between items of servo information. For a data write or data read, actuator arm 6 pivots over the surface of magnetic disk 5 during its rotation so that composite magnetic head 8 performs a seek operation to scan for an arbitrary track on magnetic disk 5. In this instance, the ABS (air bearing surface) of composite magnetic head 8, which faces the magnetic disk, receives a lift force due to an air current generated between the ABS and magnetic disk 5. As a result, composite magnetic head 8 constantly hovers a predetermined distance above the surface of magnetic disk 5.

Read head 81 and write head 82, which constitute composite magnetic head 8, are electrically connected to a head amplifier 12, which is mounted on a lateral surface of pivot axis 7 of actuator arm 6 shown in FIGS. 1 and 2. One end of a flex cable 13 is connected to head amplifier 12 to permit data exchange with card 200. A connector 14 is attached to the remaining end of flex cable 13 for connecting to card 200. A temperature sensor 15 is mounted on the upper surface of connector 14 to measure the temperature inside disk enclosure 100 (the ambient temperature for magnetic disk 5). Head amplifier 12 supplies a bias current to read head 81, amplifies a microscopic playback signal of read head 81, which captures magnetic flux variations in a data pattern stored on magnetic disk 5, and supplies a write current to write head 82 in accordance with a data pattern at the time of a data write. The details of head amplifier 12 and the method of supplying the write current to write head 82 will be described later.

Card 200 includes electronic circuits, which control the operation of actuator arm 6 and perform data read/write operations in relation to magnetic disk 5. Card 200 controls the rotation of magnetic disk 5 through a spindle/VCM driver 21 and drives VCM coil 9 to control the seek operation of actuator arm 6. Further, a data digital signal is supplied to composite magnetic head 8 by a read/write channel (R/W channel) 22 and head amplifier 12, and the supplied data digital signal and a voltage/current signal generated by composite magnetic head 8 are mutually interconverted.

R/W channel 22 is connected to a hard disk controller (HDC) 23. HDC 23 is connected to a host computer 300 and head amplifier 12 through a RAM 24 and a host interface, which is not shown. HDC 23 controls the read/write operation of RAM 24, transfers data between RAM 24 and magnetic disk 5, generates a position error signal (PES) from servo data, and transmits the positional information about composite magnetic head 8 to a microprocessing unit (MPU) 25. RAM 24 stores microcode and other device control data that are read from magnetic disk 5 at device startup. MPU 25, which is connected to HDC 23, is also connected to a temperature sensor (T sensor) 15 by an ADC (analog-to-digital converter) 28, and to RAM 24, a ROM 26, spindleNCM driver 21, and a programmable DC—DC converter 27, which is built in the spindleNCM driver 21. MPU 25 interprets a command that is transmitted from host computer 300 through HDC 23, and instructs HDC 23 to perform a data read/write operation in relation to an address specified by the command. In accordance with the positional information about composite magnetic head 8, which is generated by HDC 23, MPU 25 also transmits control information to spindleNVCM driver 21 for the purpose of performing a seek operation to position composite magnetic head 8 on a specified track. In other words, HDC 23 and MPU 25 constitute a controller. In accordance with the control information from MPU 25, spindle/VCM driver 21 drives VCM coil 9 to position composite magnetic head 8 on the specified track. ROM 26 stores microcode that is necessary, for instance, for starting HDD 1.

In the present embodiment, a power supply 301 for host computer 300 supplies a positive power supply voltage +Vcc (e.g., +5.0 or +3.3 VDC) to HDD 1. The devices within HDD 1 basically operate on a positive voltage such as +5.0 VDC, +3.3 VDC, or lower. For head amplifier 12, however, a negative power supply voltage is required in addition to +5.0 VDC and +3.3 VDC for the reason described later. Therefore, the positive power supply voltage +Vcc is supplied to programmable DC—DC converter 27 for conversion to a negative DC supply voltage −Vee, and the resulting negative DC power supply voltage is supplied to head amplifier 12.

FIG. 3(*a*) is a schematic functional block diagram illustrating the configuration of head amplifier 12. Head amplifier 12 includes a read circuit R for performing a read and a write circuit W for performing a write. Write circuit W receives a write gate signal (not shown) and write data (+WD, −WD) from R/W channel 22 (see FIG. 2). The read circuit R supplies a bias current to read head 81, receives a microscopic signal supply from read head 81, and supplies a read signal (+RD, −RD) to R/W channel 22 (see FIG. 2) by means of a preamplifier 31. Further, write circuit W supplies a write current to write head 82 through a write driver 32 in accordance with the write gate signal and write data (+WD, −WD). In the present embodiment, the write data and read signal are differentially transmitted. Therefore, read and write transmission lines are made of a pair of plus (+) and minus (−) signal wires. The write current value is set by a register 33. The details of register 33 will be described later. A clock signal, an enable signal, and a data signal, which form a serial interface, are supplied from HDC 23 (see FIG. 2) to register 33. Preamplifier 31 and write driver 32 respectively operate on the supplied positive power supply voltage +Vcc and the negative power supply voltage −Vee.

Switch 35 is incorporated in an output of write driver 32 for write circuit W. Resistor 34 is series-connected to a transmission line to write head 82. Switch 37 is incorporated in the paired, opposite-phase output of write driver 32. Resistor 36 is series-connected to the paired transmission line to write head 82. Resistors 34 and 36 are inserted to ensure that the write current value supplied to write head 82 is virtually constant irrespective of variations in the head's resistance value. The resistance values are relatively large (several tens of ohms) and about several times larger than the resistance value of write head 82. Strictly speaking, the write current slightly varies with the resistance value of write head 82. Two overshoot circuits 38, 39, which receive the supplied negative power supply voltage −Vee, are parallel-connected to the differential outputs of write driver 32. These two overshoot circuits 38, 39 are configured in the same manner.

FIG. 3(*b*) shows the details of overshoot circuit 38 (39). Overshoot circuit 38 (39) is formed by series-connecting switch 48 to a circuit that is formed by series-connecting resistors 41, 43, and 45 to switches 42, 44, and 46, respectively, and parallel-connecting these series-connected resistor-switch pairs and resistor 47. When the resistance value of resistor 47 is R1, resistor 41 is set to a resistance value of R1/2; resistor 43 is set to a resistance value of R1/4; and resistor 45 is set to a resistance value of R1/8. Switches 42, 44, and 46 for overshoot circuits 38 and 39 are either turned ON or OFF in order to minutely determine the data write initial peak current (so that the switching speed simultaneously varies), which will be described later. Switch 48 is turned ON only for the period during which overshoot circuit 38 or 39 operates (the period of time required for electrical current direction reversal).

Figure 4:
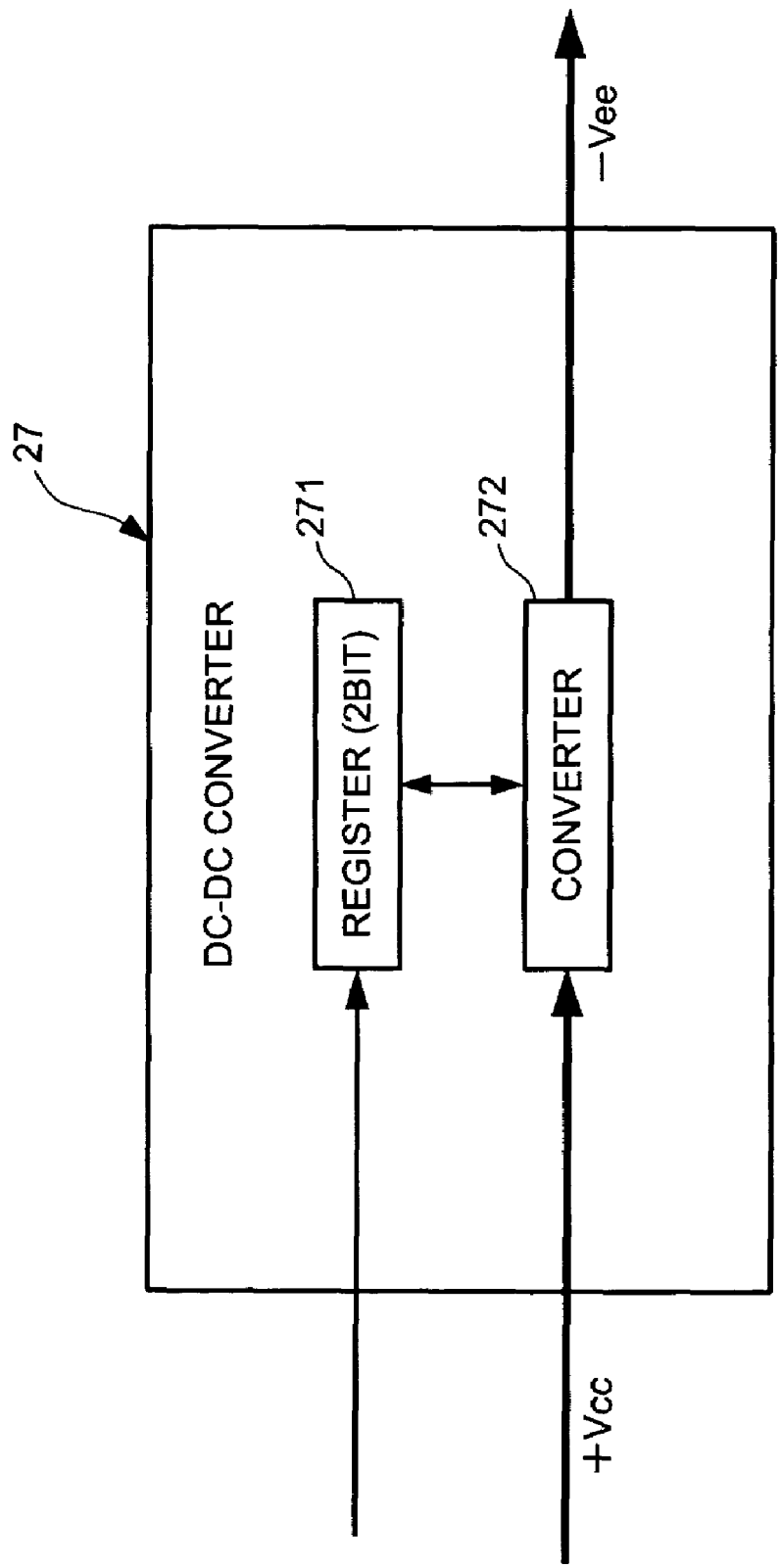
FIG. 4 is a schematic functional block diagram illustrating the configuration of a programmable DC—DC converter.

FIG. 4 is a schematic functional block diagram illustrating the converter configuration of the programmable DC—DC converter 27. The programmable DC—DC converter 27 includes a register 271 and a voltage converter (DC—DC converter) 272. Register 271 stores voltage command information received from MPU 25. Voltage converter (DC—DC converter) 272 converts a positive power supply voltage +Vcc, received from host computer 300, to a predefined negative power supply voltage −Vee. In the present embodiment, two bits of register 271 are used to store the voltage command information, whereas converter 272 can convert the received positive power supply voltage +Vcc into four different negative power supply voltages −Vee in accordance with the information stored in register 271 and output the converted voltages (−5.0 V (register 271: 00), −4.7 V (register 271: 01), −4.4 V (register 271: 10), and −4.0 V (register 271: 11) in the present embodiment).

Figure 3B:
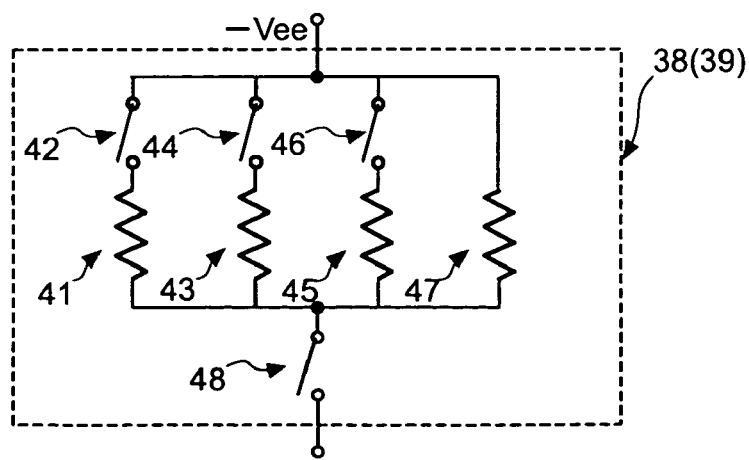
FIG. 3(b) shows the details of an overshoot circuit.
Figure 5A:
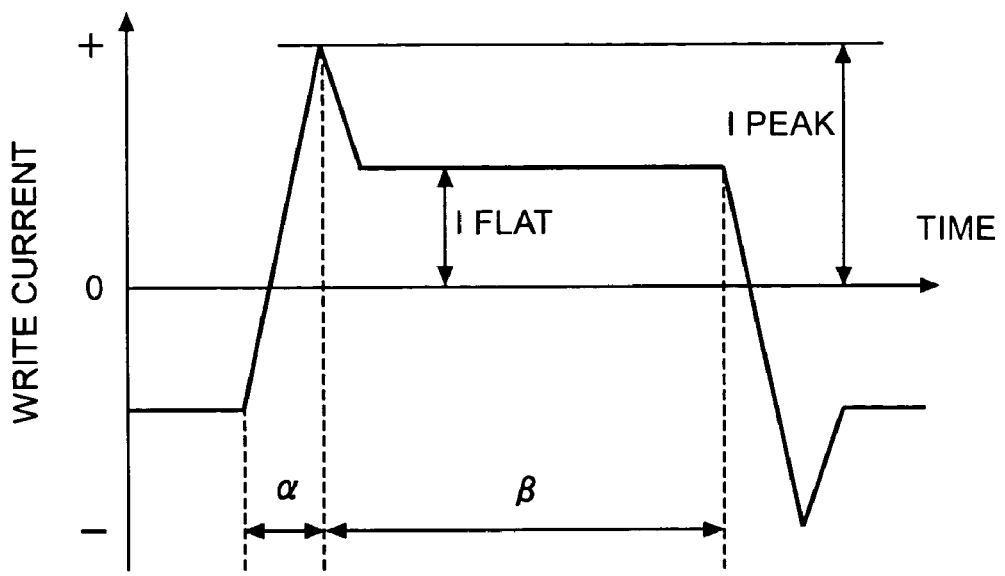
FIG. 5(a) illustrates a write current.

In the present embodiment, eight bits of register 33 shown in FIG. 3 are assigned as write current value setup bits. More specifically, five of the eight bits are assigned for steady-state current setup, whereas the remaining three bits are assigned for initial peak current setup. The steady-state current is the current steadily supplied to write head 82 of composite magnetic head 8 while data is being written onto magnetic disk 5. The initial peak current is the current supplied to write head 82 of composite magnetic head 8 in addition to the steady-state current at an initial stage of a data write onto magnetic disk 5. Therefore, when the write current value prevailing at an initial stage of a write is Ipeak and the write current value prevailing after the initial stage of a write is Iflat, the Ipeak (initial current) setting is usually smaller than the Iflat (steady-state current) setting as shown in FIG. 5(a) in order to decrease the time required for current direction reversal. Since the rated current value is determined by 5 bits, 32 different steady-state current settings are selectable. Further, since the initial peak current value is determined by 3 bits, 8 different initial peak current settings are selectable. In the present embodiment, the initial peak current value can be set by determining the current-limiting resistance value by turning ON/OFF switches 42, 44, and 46 (corresponding to 3 bits) while switch 48 for activating the overshoot circuit 38 (39) shown in FIG. 3(b) is ON.

Figure 5B:
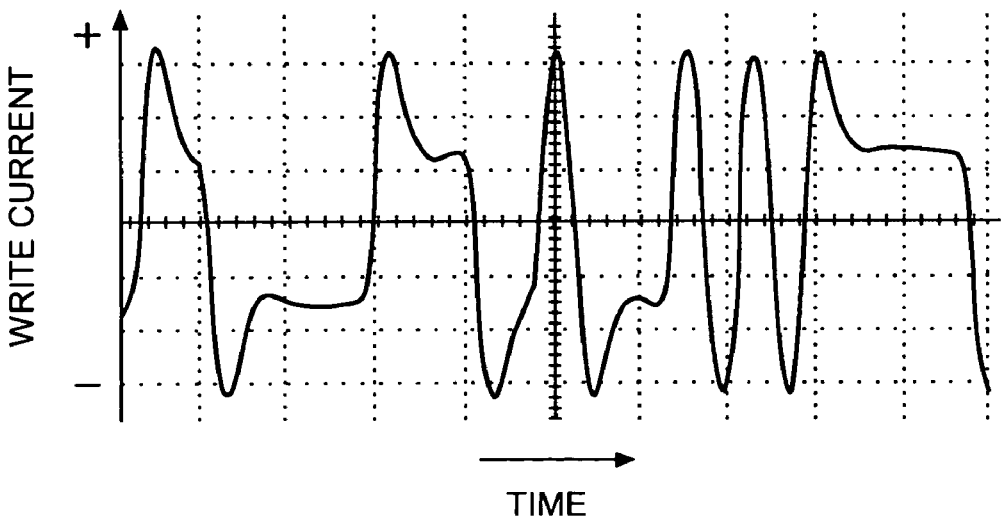
FIG. 5(b) shows a waveform of an actual write current.

FIG. 5(b) shows a waveform of an actual write current. This figure reveals that the initial peak current waveform (which provides Ipeak formation) is more influential on the actual write current than the Iflat current value, which prevails subsequently to the initial peak current.

FIG. 6 illustrate the operation that write circuit W performs for a data write. The operation performed to write data onto magnetic disk 5 is now be described with reference to FIGS. 5 and 6. In the subsequent description, the expression "overshoot circuit 38 (or 39) is connected" means that switch 48 within overshoot circuit 38 (or 39) is connected, and the expression "overshoot circuit 38 (or 39) is not connected" means that switch 48 within overshoot circuit 38 (or 39) is disconnected. Within overshoot circuit 38 (or 39), the status of switch 48 is not related to the status of the other switches 42, 44, 46. Switch 48 determines the time at which overshoot circuit 38 (or 39) actuates, whereas switches 42, 44, and 46 determine the magnitude of the operation performed by overshoot circuit 38 (or 39).

Figure 6A:
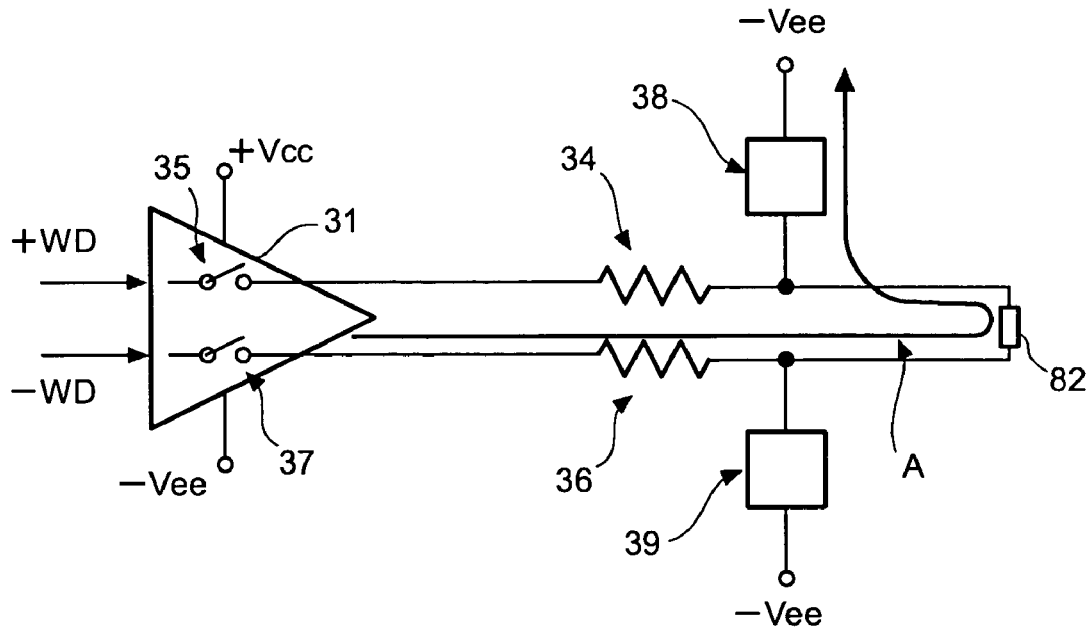
FIG. 6 illustrate the operation that a write circuit performs for a data write.

FIG. 6(a) illustrates how write circuit W is connected when the write current direction reverses. Only switch 37 and switch 48, which is within overshoot circuit 38, are ON and overshoot circuit 39 is disconnected. As a result, the current flow to write head 82 is oriented in the direction indicated by arrow A in the figure. This corresponds to time region α in FIG. 5(a). More specifically, the Ipeak write current flows to write head 82 at an initial stage of current reversal, and magnetization direction reversal (not shown) is effected quickly and strongly for the magnetic film on magnetic disk 5 (see FIGS. 1 and 2) during a data write.

Figure 6B:
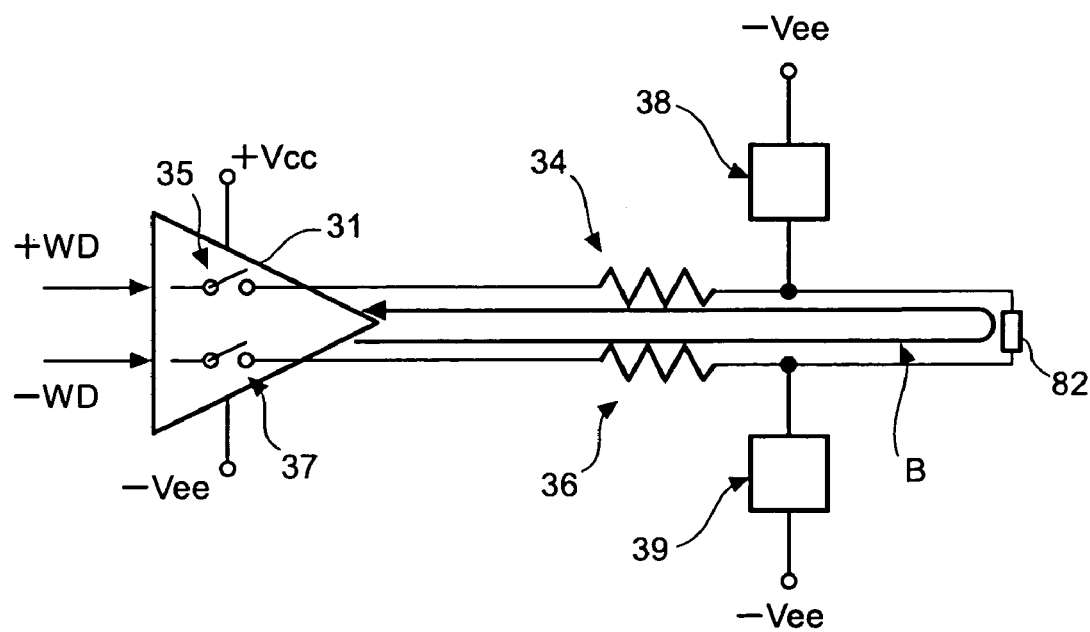

FIG. 6(b) illustrates how write circuit W is connected after electrical current reversal (in the steady state). In the steady state, switches 35 and 37 are connected and overshoot circuits 38 and 39 are both disconnected. This corresponds to region β in FIG. 5(a). More specifically, the Iflat write current flows to write head 82 in the steady state. In this state, the magnetic film on magnetic disk 5 is easily magnetized by the Iflat write current value, which is smaller than the Ipeak write current value.

When the direction of magnetic film magnetization reverses again to write data, switch 35 and switch 48, which is within overshoot circuit 39, turn ON and overshoot circuit 38 is disconnected. When the steady state arises, switches 35 and 37 are connected and overshoot circuits 38 and 39 are both disconnected.

The above-described switching operations are sequentially performed to write data onto magnetic disk 5.

Figure 7:
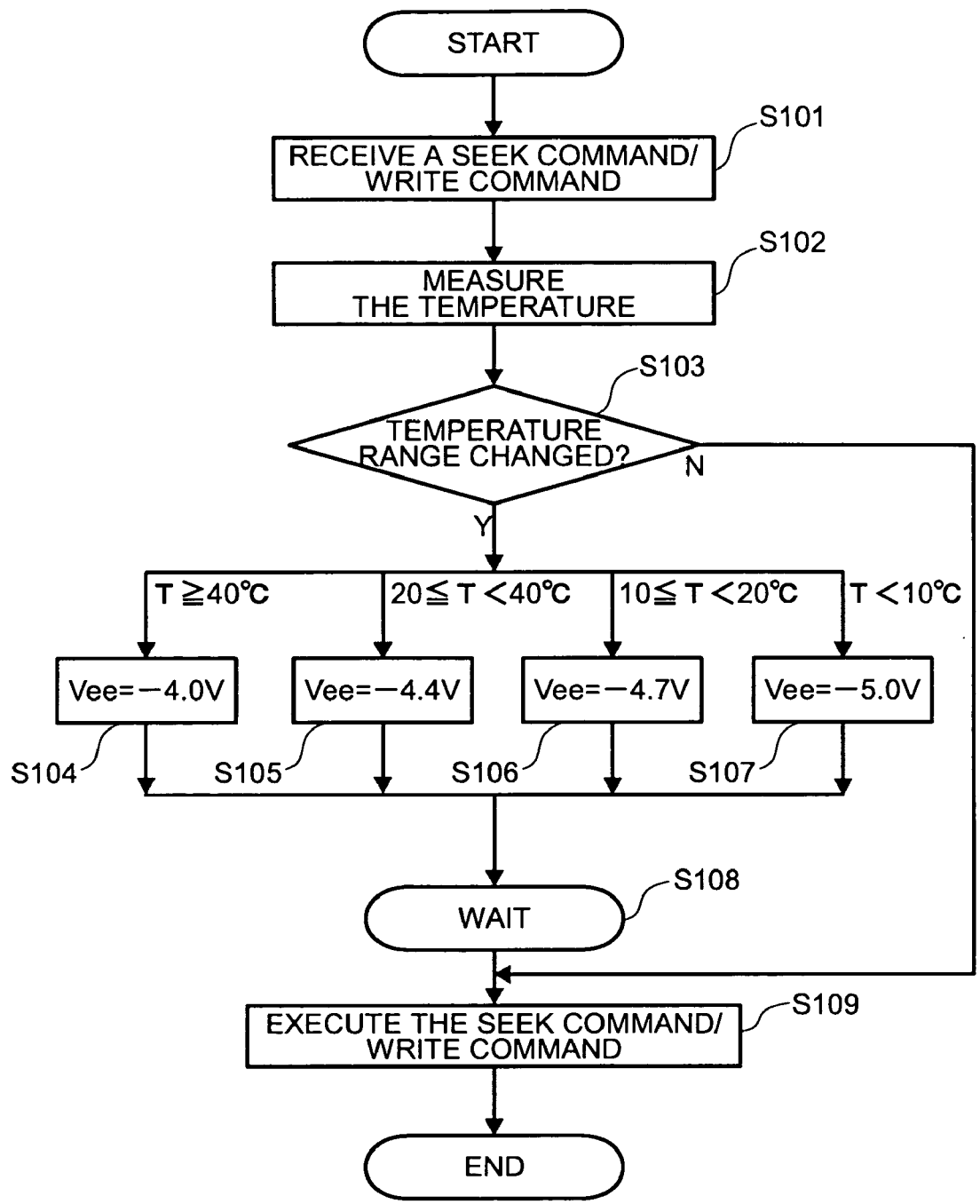
FIG. 7 is a flowchart that illustrates the negative power supply voltage setup process according to Embodiment 1.

In the present embodiment, the magnitude of the negative power supply voltage −Vee, which is generated by DC—DC converter 27, is adjusted in accordance with the environment (temperature) in which HDD 1 exists. The process for setting the negative power supply voltage −Vee is now be described with reference to the flowchart shown in FIG. 7. The program performing the process is stored in ROM 26 as microcode. Further, additional microcode read from the disk is stored in RAM 24.

When HDC 23 receives a seek command or a write command (step S101), MPU 25 receives temperature information from temperature sensor 15 by means of ADC 28 (step S102) and determines whether the temperature range is changed (step S103). If the temperature range is changed, the negative power supply voltage −Vee is variously set depending on the temperature T. When the temperature T is not lower than 40° C., the negative power supply voltage −Vee is set to −4.0 V (step S104). When the temperature T is 20° C. or higher but lower than 40° C., the negative power supply voltage −Vee is set to −4.4 V (step S105). When the temperature T is 10° C. or higher but lower than 20° C., the negative power supply voltage −Vee is set to −4.7 V (step S106). When the temperature T is lower than 10° C., the negative power supply voltage −Vee is set to −5.0 V (step S107). More specifically, MPU 25 issues a voltage command to programmable DC—DC converter 27 causing the converter to rewrite the contents of register 271 in accordance with the received voltage command information. Then, converter 272 converts a positive power supply voltage +Vcc to a target negative power supply voltage −Vee and supplies it to head amplifier 12. Step S108 is then performed to wait for a predetermined period until the voltage stabilizes. Next, the seek command or write command is executed (step S109) to conclude the process. If it is found at step S103 that the temperature range has not changed, the seek command or write command is executed immediately (step S109) to conclude the process.

Figure 8:
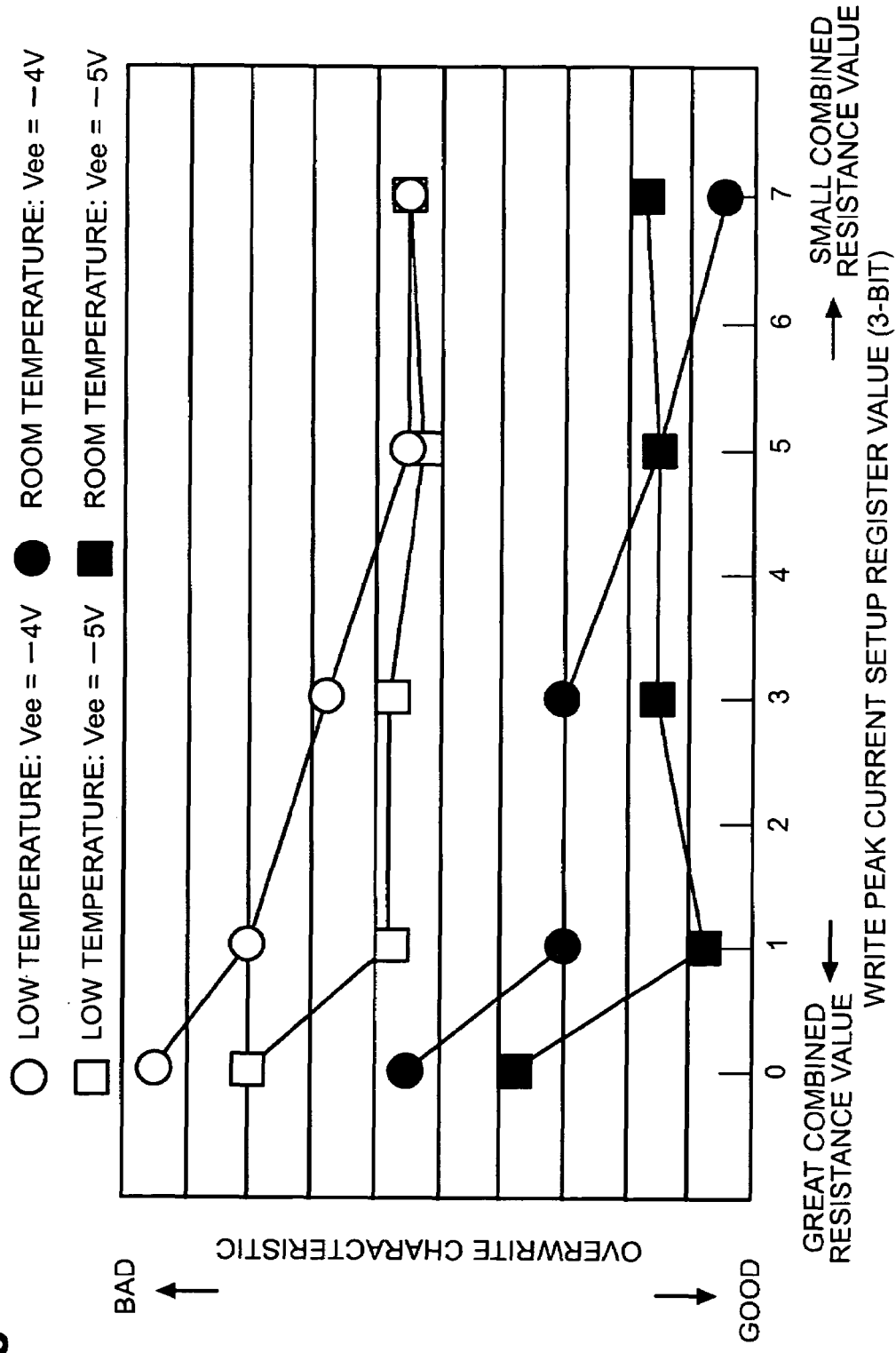
FIG. 8 is a graph that illustrates the relationship between the write peak current setup register value and the overwrite characteristic when the temperature and negative power supply voltage are used as parameters.

The advantage derived from adjusting the negative power supply voltage −Vee in accordance with the temperature T is described next. FIG. 8 is a graph illustrating the relationship between the overwrite characteristic and the current limiting resistance setup register (3-bit) value of overshoot circuit 38 (39) provided in head amplifier 12 when the disk ambient temperature T and the negative power supply voltage −Vee are used as parameters. The ON/OFF states of switches 42, 44, and 46 correspond to the 3 bits above. When all three switches are OFF, the value 0 results (register 33: 000). When only switch 42 is ON, the value 1 results (register 33: 001). When switches 42 and 44 are ON, the value 3 results (register 33: 011). When switches 44, 46, and 48 are ON, the value 7 results (register 33: 111). Resistors 41, 43, 45, and 47 are parallel-connected within the overshoot circuit 38 (39). Therefore, the greater the resistance register values, the smaller their combined resistance value. It is obvious from FIG. 8 that an excellent overwrite characteristic can be obtained by increasing the absolute value of the negative power supply voltage −Vee. The figure also indicates that an adequate overwrite characteristic can also be obtained without increasing the absolute value of the negative power supply voltage −Vee if the ambient temperature is equivalent to the room temperature. In other words, the overwrite characteristic obtained at an ordinary temperature when the negative power supply voltage −Vee is set at −4.0 V is better than that obtained at a low ambient temperature when the negative power supply voltage −Vee is set at −5.0 V. It means that no problem arises when the negative power supply voltage −Vee is adjusted according to the temperature T; more specifically, when the absolute value of the negative power supply voltage −Vee is increased at a low temperature and decreased at an ordinary temperature. When the absolute value of the negative voltage is Vee and the combined resistance value determined by the resistors is R, the write initial peak current value Ipeak can theoretically be expressed as Vee/R. However, the Power is $Vee^2/R$. Therefore, the value Power is decreased to a greater extent when the value Ipeak is decreased by decreasing the value −Vee than when the value Ipeak is decreased by adjusting the value R.

Figure 9:
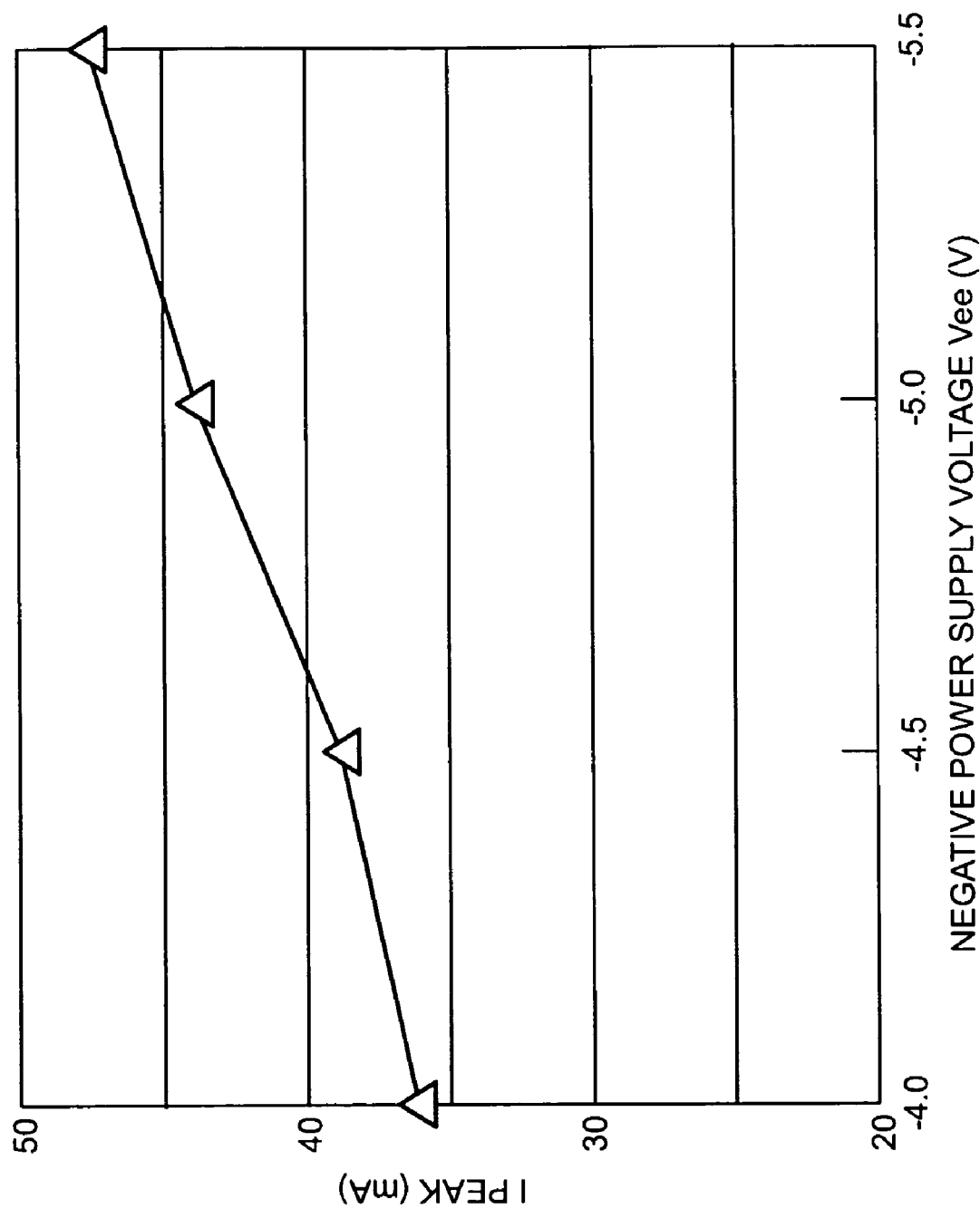
FIG. 9 is a graph that illustrates the relationship between the negative power supply voltage and the write initial peak current value.

FIG. 9 is a graph that illustrates the relationship between the negative power supply voltage −Vee and the write initial peak current value Ipeak. This figure assumes that the resistance register values are constant. The figure reveals that the write initial peak current value Ipeak can be increased by increasing the absolute value of the negative power supply voltage −Vee. It indicates that the write initial peak current value Ipeak should be increased in a low-temperature region where the coercivity Hc of the magnetic film on magnetic disk 5 is relatively high and decreased in an ordinary/high-temperature region where the coercivity Hc is relatively low. Consequently, it means that no problem arises when the absolute value of the negative power supply voltage −Vee is increased at a low temperature and decreased at an ordinary temperature.

Figure 10:
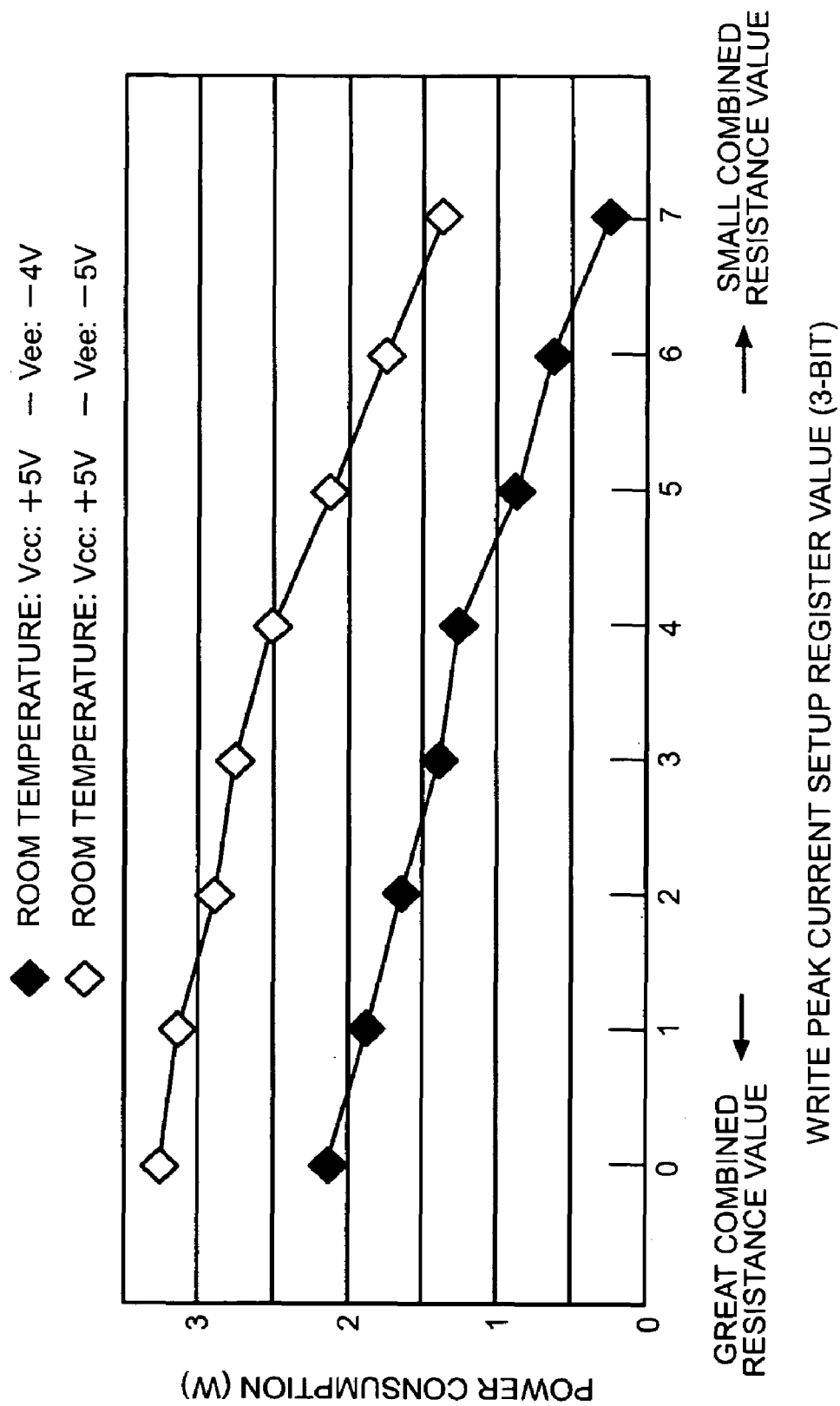
FIG. 10 is a graph that illustrates the relationship between the write initial peak current value setup register values and the write circuit power consumption when the negative power supply voltage is used as a parameter.

FIG. 10 is a graph that illustrates the relationship between the resistance registers and the power consumption of write circuit W when the negative power supply voltage −Vee is used as a parameter. It is assumed that the positive power supply voltage +Vcc is fixed at +5.0 V. It is obvious from the figure that the power consumption of the write circuit W (head amplifier 12) can be reduced by decreasing the absolute value of the negative power supply voltage −Vee. The reduction in power consumption by head amplifier 12 also results in a decrease in the heat release from head amplifier 12. Therefore, the junction temperature (Tj) of internal components of head amplifier 12, such as an FET (Field Effect Transistor) and other transistors, can be lowered accordingly during a write.

In the present embodiment, the negative power supply voltage −Vee to be supplied to head amplifier 12 is adjusted as needed in accordance with the temperature T surrounding HDD 1 and without sacrificing the overwrite characteristic. This reduces power consumption because no extra power is supplied to head amplifier 12. Further, the reduction in power consumption decreases the amount of heat released from he head amplifier 12, thereby lowering the junction temperature of head amplifier 12 with a view toward reliability enhancement.

Furthermore, when the negative power supply voltage −Vee is to be changed, a write operation will not be performed until the resulting negative power supply voltage −Vee stabilizes. This will avoid a write error that may result from voltage instability.

In the present embodiment, the negative power supply voltage −Vee is varied in four steps. Alternatively, however, the negative power supply voltage −Vee may be varied continuously or in an increased or decreased number of steps.

Embodiment 2

Embodiment 2 is substantially the same as Embodiment 1 except that write circuit W, which supplies a write current to write head 82, provides current drive for write head 82 instead of voltage drive. Components identical with the counterparts described in conjunction with Embodiment 1 are assigned the same reference numerals as their counterparts and are not described again in detail.

Figure 11:
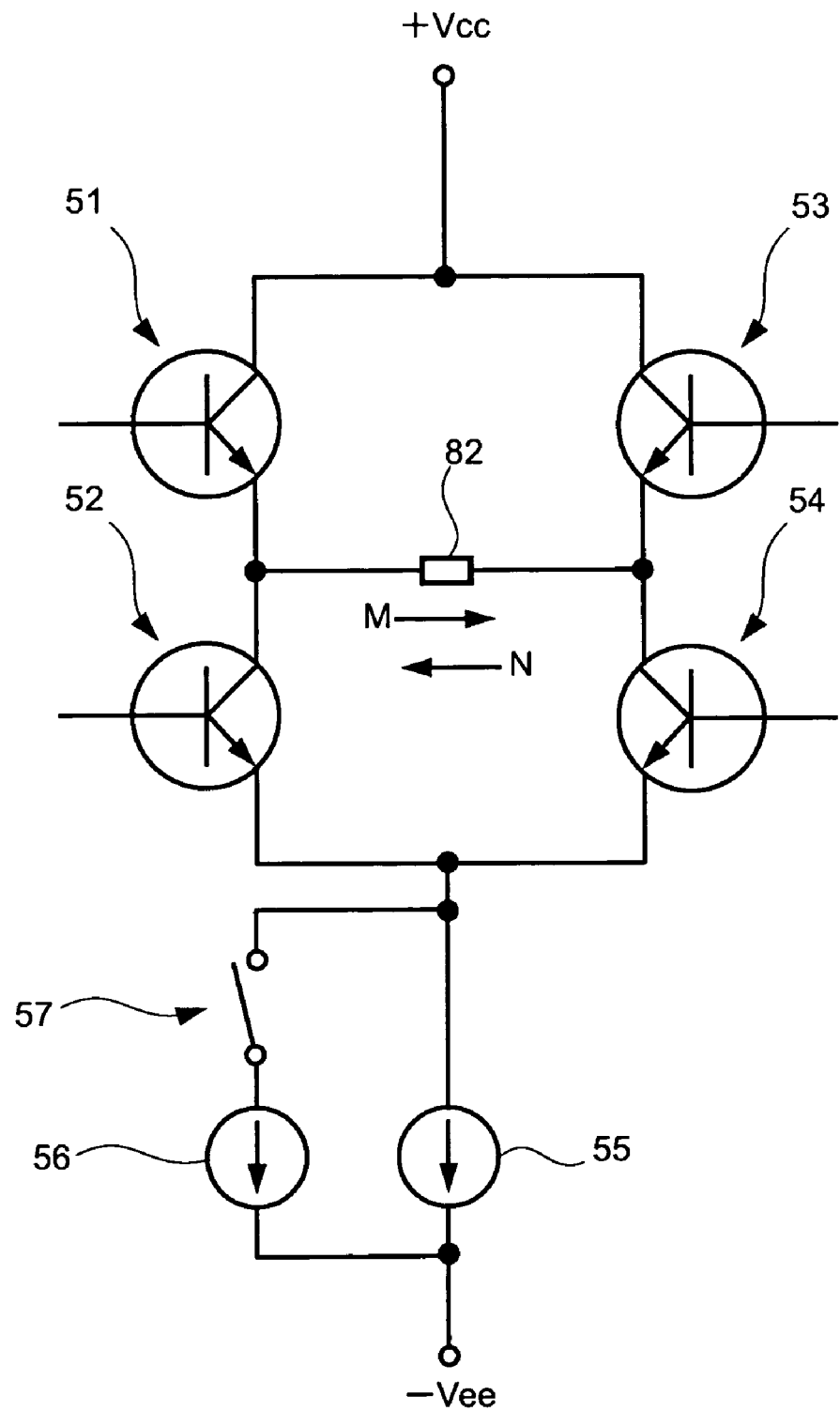
FIG. 11 illustrates a write circuit according to Embodiment 2.

FIG. 11 illustrates a current-drive write circuit W. Write circuit W comprises four bridge-connected transistors 51–54, a constant current supply 55 that is series-connected to the bridge for the above transistors, another constant current supply 56 that is parallel-connected to constant current supply 55 to form an overshoot circuit, and a series-connected switch 57. Write head 82 is connected to the bridge for transistors 51–54. A positive power supply voltage +Vcc is supplied from one end of the bridge for transistors 51–54, and a negative power supply voltage −Vee is supplied to one end of constant current supply 55. When transistors 51 and 54 are turned ON, write circuit W can supply current to write head 82 in the direction of arrow M. When transistors 52 and 53 are turned ON, write circuit W can supply current to write head 82 in the direction of arrow N. Under normal conditions, the current values of constant current supplies 55 and 57 can be adjusted with a register.

When the write current direction reverses, write circuit W turns ON switch 57. As a result, constant current supplies 55 and 56 both supply current to write head 82. This corresponds to region α in FIG. 5(a). More specifically, when the write current direction reverses, the write initial peak current Ipeak flows to write head 82 so that the magnetization direction for the magnetic film on magnetic disk 5 (see FIGS. 1 and 2) reverses quickly and strongly during an initial stage of a data write as well. Consequently, the formed magnetic film (not shown) is readily magnetized.

Meanwhile, switch 57 turns OFF after current direction reversal. As a result, only constant current supply 55 supplies current to write head 82. This corresponds to region β in FIG. 5(a). In other words, the write current Iflat flows to write head 82 in the steady state. In this state, the magnetic film on magnetic disk 5 is readily magnetized by the write current value Iflat, which is smaller than the write initial peak current value Ipeak.

If the absolute value for the positive or negative power supply voltage decreases in situations where the write current is supplied from both constant current supplies 55 and 56, the write current cannot flow properly. When a current drive is employed, the influence of power supply voltage variations and write head resistance variations on the write initial peak current value Ipeak and subsequent write current value Iflat is smaller than when a voltage drive is employed. The reason is that the write current is maintained constant by the constant current supplies. However, if the absolute value for the positive or negative power supply voltage decreases, the specified current may not always flow. This phenomenon can be used effectively. When the temperature is low, the absolute value for the negative power supply voltage can be increased to obtain a large write initial peak current value Ipeak and subsequent write current value Iflat. However, when the temperature is not low, the write current, that is, the constant current supply's current value, is decreased. Therefore, no problem will arise even if the absolute value for the negative power supply voltage is decreased to match the resulting capacity.

In the present embodiment, too, the negative power supply voltage −Vee to be supplied to head amplifier 12 is adjusted as needed in accordance with the environment (temperature) in which HDD 1 exists. This reduces power consumption because no extra power is supplied to head amplifier 12. In other words, the use of a current-drive write circuit W also provides the same advantages as Embodiment 1.

Embodiment 3

Embodiment 3 is the same as Embodiment 1 except that the magnitude of the negative power supply voltage −Vee is adjusted in accordance with the average value of the positive power supply voltage +Vcc supplied to HDD 1. Components identical with the counterparts described in conjunction with Embodiment 1 are assigned the same reference numerals as their counterparts and are not described again in detail.

Figure 12:
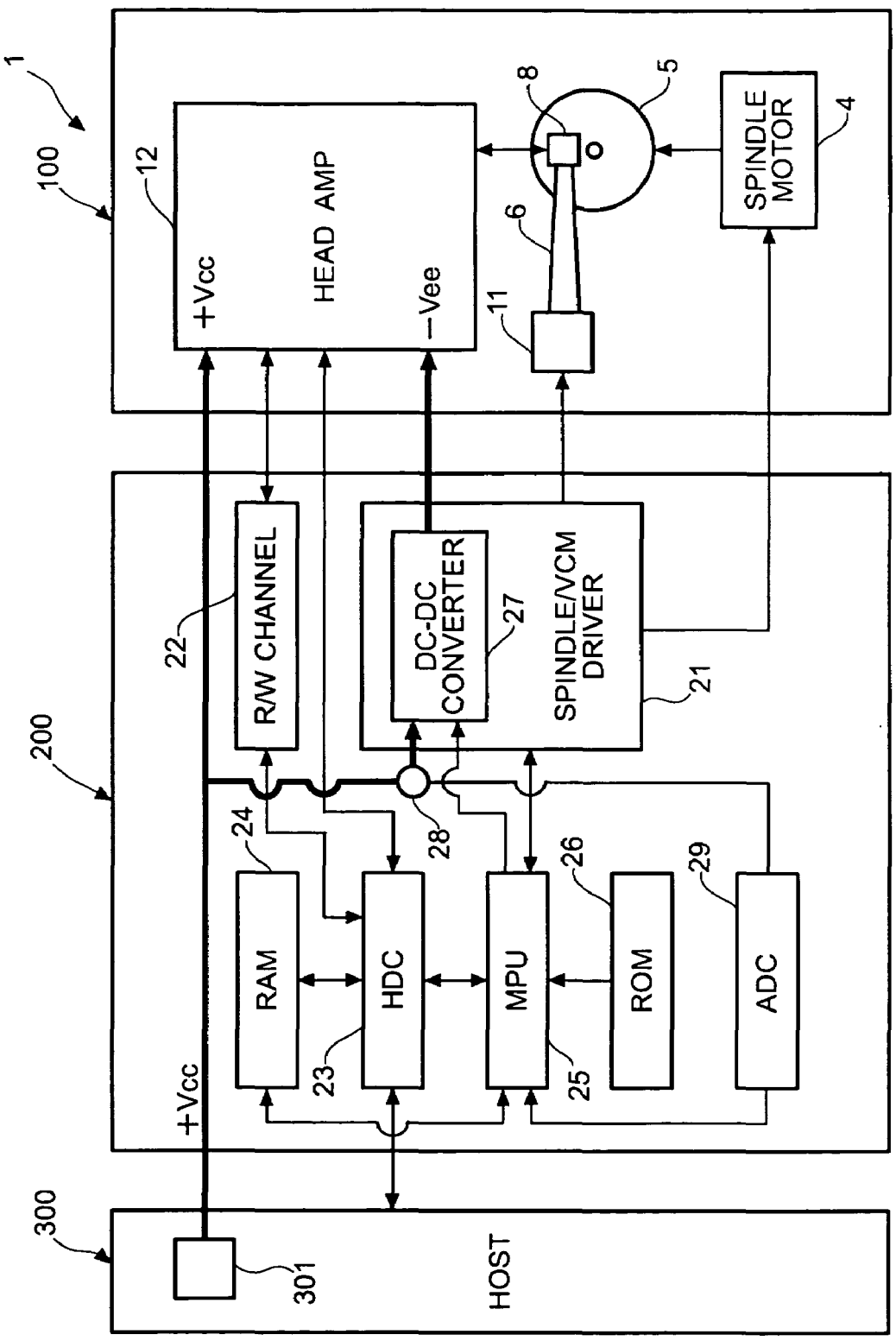
FIG. 12 is a functional block diagram of a HDD according to Embodiment 3.

FIG. 12 is a functional block diagram of HDD 1 according to Embodiment 3. In the present embodiment, the +Vcc voltage supplied to the head amplifier is generally the same as input voltage 28 for programmable DC—DC converter 27. However, ADC 29 is installed in order to measure the +Vcc voltage. Therefore, the +Vcc voltage information converted to a digital signal is conveyed to HDC 23.

The process for setting the negative power supply voltage −Vee is now described with reference to the flowchart shown in FIG. 13. The program performing the process is stored in ROM 26 or in RAM 24 as microcode that is read from the disk on startup.

When HDC 23 receives a seek command or a write command (step S201), the measured value of the positive power supply voltage +Vcc is received through ADC 29 (step S202). HDC 23 calculates the difference ΔV from the original positive power supply voltage (+5 VDC) (step S203). The negative power supply voltage −Vee to be generated is then shifted by 50% of the calculated difference ΔV (step S204). If, for instance, the received positive power supply voltage +Vcc is +5.2 VDC, the absolute value of the negative power supply voltage −Vee to be generated is decreased by 0.1 V. If the received positive power supply voltage +Vcc is +4.6 VDC, the absolute value of the negative power supply voltage −Vee to be generated is increased by 0.2 V. Step S205 is then performed to wait for a predetermined period until the voltage stabilizes. Next, the seek command or write command is executed (step S206) to conclude the process. The shift by 50% of the difference ΔV is merely an example. In general, when the write current direction reverses, the positive voltage is supplied to the write head by resistor 34 or 36, which has a relatively large resistance value (several tens of ohms), and the negative voltage is supplied to the write head by a combined resistance value that is set by the resistance register values and is smaller than that provided by resistor 34 or 36, as shown in FIG. 3. Therefore, changes in the negative voltage exert a greater influence upon the write initial peak current value Ipeak than those in the positive voltage.

In general, the positive power supply voltage +Vcc received from host computer 300 varies to some extent and is more unstable than the negative power supply voltage −Vee generated within HDD 1. Therefore, when the negative power supply voltage −Vee is generated in such a manner to avoid a decrease in the potential difference in accordance with the positive power supply voltage +Vcc received from host computer 300 as described above, the write current value Ipeak, which prevails during the initial stage of a write, can be prevented from decreasing with a view toward maintaining a good overwrite characteristic. Further, as an alternative to receiving a measured value of the positive power supply voltage +Vcc each time HDC 23 receives a seek command or write command, the +Vcc voltage can be obtained periodically to determine the average +Vcc voltage.

As described above, the present invention makes it possible to avoid extra power consumption. The present invention also prevents the write current from being decreased by variations in the supplied power supply voltage.

DESCRIPTION OF THE SYMBOLS

1: Hard disk drive (HDD)
4: Spindle motor
5: Magnetic disk
6: Actuator arm
8: Composite magnetic head
11: VCM
12: Head amplifier
15: Temperature sensor
21: Spindle/VCM driver
22: Read/write channel (R/W channel)
23: Hard disk controller (HDC)
24: RAM
25: MPU
26: ROM
27: Programmable DC—DC converter
31: Preamplifier
32: Write driver
33: Register
38, 39: Overshoot circuit
80: ILS (integrated lead suspension)
81: Read head
82: Write head
100: Disk enclosure
200: Card
271: Register
272: Converter
300: Host computer
R: Read circuit
W: Write circuit While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiments disclosed, but that the invention will include all embodiments and equivalents falling within the scope of the claims.

What is claimed is:

1. A data storage device, comprising:
   a write head for writing data onto a magnetic disk;
   a write circuit configured to generate the write current to be supplied to said write head by using a supplied positive voltage and a supplied negative voltage;
   a converter configured to generate said negative voltage to be supplied to said write circuit from said positive voltage; and
   a programmable controller configured to variably set the magnitude of said negative voltage based on information input to said controller;
   wherein said controller sets the magnitude of said negative voltage in accordance with an ambient temperature for said magnetic disk.

2. The data storage device according to claim 1, wherein said controller sets a large absolute value for said negative voltage if said ambient temperature is low, and sets a small absolute value for said negative voltage if said ambient temperature is high.

3. The data storage device according to claim 1, wherein said controller changes the magnitude of said negative voltage when said write head is not performing a write operation.

4. The data storage device according to claim 1, wherein said write circuit ensures that the write current value used for a specified period after the start of a write is greater than the write current value used after the elapse of the specified period.

5. The data storage device according to claim 1, wherein said write circuit isof a voltage-driven type that directly provides voltage drive for said write head.

6. The data storage device according to claim 1, wherein said converter comprises a register for storing a voltage command from said controller and a voltage converter for converting the voltage in accordance with the value stored in said register.

7. The data storage device of claim 1, wherein said controller uses stored voltage command information in a register to variably set the magnitude of said negative voltage.

8. The data storage device of claim 7, wherein the magnitude of said negative voltage is set to a predefined voltage defined by said stored voltage command information.

9. A data storage device comprising:
   a write head for writing data onto a magnetic disk;
   a write circuit configured to generate the current to be supplied to said write head by using a supplied positive voltage and a supplied negitive voltage;
   a converter configured to generate said negative voltage to be supplied to said write circuit from said positive voltage; and
   a programmable controller configured to variably set the magnitude of said negative voltage based on information input to said controller;
   wherein said controller sets the magnitude of said negative voltage in accordance with the magnitude of said positive voltage;
   wherein said controller sets a large absolute value for said negative voltage if said positive voltage is low, and sets a small absolute value for said negative voltage if said positive voltage is high.

10. A data write method, comprising:
    receiving a seek command or a write command for a read/write head over a magnetic disk;
    setting by a controller the magnitude of the negative voltage to be supplied to a drive circuit for said read/write head in accordance with a specified condition based on information input to the controller, the negative voltage being generated from a positive voltage supplied to the drive circuit; and
    causing said read/write head over said magnetic disk to perform a seek operation or a write operation;
    wherein said specified condition is the ambient temperature for said magnetic disk.

11. The data write method according to claim 10, wherein said second step sets a large absolute value for said negative voltage if said ambient temperature is low and sets a small absolute value for said negative voltage if said ambient temperature is high.

12. A data write method comprising:
    receiving a seek command or a write command for a read/write head over a magnetic disk;
    setting by a controller the magnitude of a negative voltage to be supplied to a drive circuit for said read/write head in accordance with a specified condition based on information input to the controller, the negative voltage being generated from a positive voltage supplied to the drive circuit; and
    causing said read/write head over said magnetic disk to perform a seek operation or a write operation;
    wherein said specified condition is the magnitude of said supplied positive voltage;
    wherein said second step sets a large absolute value for said negative voltage if said positive voltage is low and sets a small absolute value for said negative voltage if said positive voltage is high.

13. A data storage device, comprising:
    a write head for writing data onto a magnetic disk:
    a write circuit configured to generate the write current to be supplied to said write head by using a supplied positive voltage and a supplied negative voltage;
    a converter configured to generate said negative voltage to be supplied to said write circuit from said positive voltage; and
    a programmable controller configured to variably set the magnitude of said negative voltage based on information input to said controller;
    wherein said controller sets the magnitude of said negative voltage in accordance with the average value of said positive voltage.

14. The data storage device according to claim 13, wherein said controller changes the magnitude of said negative voltage when said write head is not performing a write operation.

15. The data storage device according to claim 13, wherein said write circuit ensures that the write current value used for a specified period after the start of a write is greater than the write currant value used after the elapse of the specified period.

16. The data storage device according to claim 13, wherein said write circuit is of a voltage-driven type that directly provides voltage drive for said write head.

17. The data storage device according to claim 13, wherein said converter comprises a register for storing a voltage command from said controller and a voltage converter for converting the voltage in accordance with the value stored in said register.

18. The data storage device according to claim 13, wherein said controller uses stored voltage command information in a register to variably set the magnitude of said negative voltage.

19. A data write method, comprising:
receiving a seek command or a write command for a read/write head over a magnetic disk;
setting by a controller the magnitude of a negative voltage to be supplied to a drive circuit for said read/write head in accordance with a specified condition based on information input to the controller, the negative voltage being generated from a positive voltage supplied to the drive circuit;
causing said read/write head over said magnetic disk to perform a seek operation or a write operation; and
prior to causing the read/write head to perform the seek operation or the write operation:
storing values of previous positive and negative voltages;
measuring the value of a supplied positive voltage; and
computing the difference between the value of said supplied positive voltage and the value of said previous positive voltage;
wherein said specified condition used in setting the magnitude of the negative voltage is the computed difference.

20. The method of claim 19, further comprising waiting for a preset period of time to allow the voltage to stabilize after setting the magnitude of the negative voltage before causing the read/write head to perform the seek operation or the write operation.

* * * * *